Dec. 23, 1969  L. J. SIEGHARTNER  3,485,266
COMBINED VENT AND OVERFLOW MEANS FOR AN ENCLOSED
FLUID CONTAINING VESSEL
Filed Oct. 12, 1967
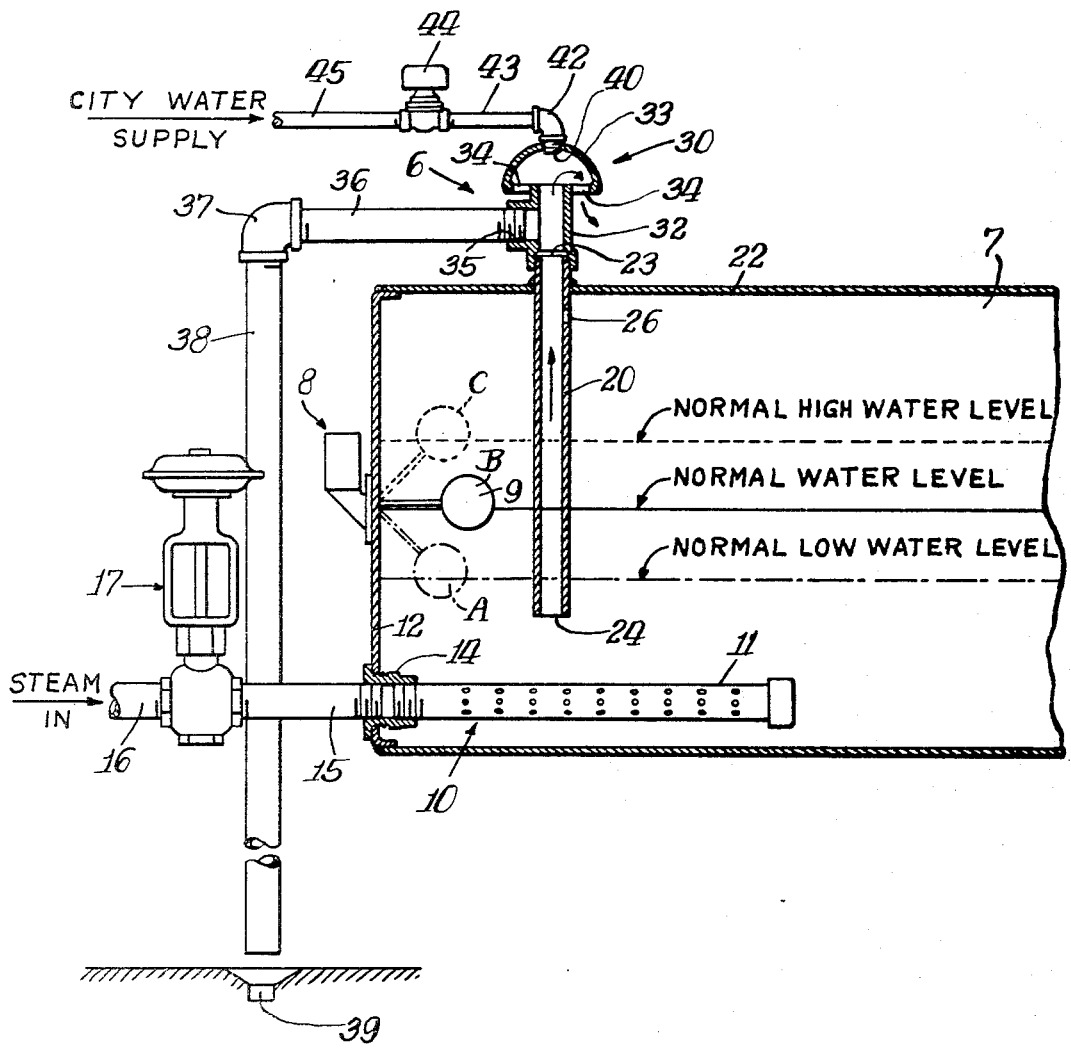
Inventor:—
Leonard J. Sieghartner,

United States Patent Office 3,485,266
Patented Dec. 23, 1969

3,485,266
COMBINED VENT AND OVERFLOW MEANS FOR AN ENCLOSED FLUID CONTAINING VESSEL
Leonard J. Sieghartner, Rock Island, Ill., assignor to Roy E. Roth Company, Rock Island, Ill., a corporation of Illinois
Filed Oct. 12, 1967, Ser. No. 674,914
Int. Cl. B67d 5/32, 5/60
U.S. Cl. 137—588                                    7 Claims

ABSTRACT OF THE DISCLOSURE

A combined vent and overflow means for an enclosed fluid containing vessel having float control means and fluid heating means for maintaining fluid in the vessel between predetermined high and low levels, and for heating the fluid in the vessel, respectively, defined by an open ended conduit extending vertically through the upper end of the vessel with the lower open end of the conduit lying below the surface of the predetermined low level of the fluid in the boiler, and with the upper open end of the conduit opening externally of the upper end of the vessel.

---

The present invention is concerned with a combined vent and overflow means for enclosed heated fluid containing vessels such as boilers or receiving tanks.

In heating and in various manufacturing processes boilers or like devices are utilized as a source of heated fluid, and as the heated fluid is withdrawn from the vessel the vessel is replenished from a source of the fluid, or condensate is returned to the vessel, at which heat is applied to bring the contained fluid to the desired temperature for the purposes for which it is being used. In such typical installations, known float control valve means are employed for maintaining the fluid level in the vessel between desired predetermined high and low levels. These known float control valve means provide for admission of fluid to the vessel at the predetermined low level and cease or shut off flow of fluid to the vessel at the predetermined high level. Also, heating means of a wide variety of types are well known and are employed to maintain the fluid in the vessel at a desired predetermined temperature.

The vessels of the foregoing class to which the present invention is applicable are for so-called vented service— that is vessels in which the fluid in the vessel is maintained at a temperature not exceeding its normal atmosphere boiling temperature.

The prior art vessels of the foregoing class usually have simple vent openings at the upper ends thereof which may be readily clogged or blocked as, for example, by debris floating in the fluid in the vessel. It is not uncommon, for example, to have the float of a float control valve means break away and float to a position blocking the vented outlet. Thus in the event of failure of the float control valve means to close off feed of fluid to the boiler after the predetermined high level has been reached, or failure of the fluid heating means to deenergize after the contained fluid reaches the desired temperature can readily result in explosive conditions since the vent cannot function.

The present invention concerns itself with a simple and inexpensive vent and overflow means which is not subject to the foregoing and other disadvantages of the prior art.

In the present invention an open ended conduit, or straight section of pipe, is mounted in the vessel to extend vertically through the upper end of the vessel, and is of suitable length with respect to the depth of the vessel so that the open upper end opens externally of the upper end of the vessel, and the open lower end lies below the surface of the fluid in the vessel when at a predetermined low level.

The foregoing arrangement has many advantages. For example, since the lower end of the conduit is below the surface of the predetermined low level of the fluid in the vessel, debris floating in the fluid cannot block or clog the lower open end of the conduit. Additionally, since the lower end of the conduit extends into the fluid at all times and is of small cross sectional area compared to the large surface area of the fluid in the vessel, excessive escape of steam is prevented thus eliminating the need for the vent to discharge outdoors. This is the further advantage in that no component of the vent need be exposed to undesirable outdoor weather conditions such as the accumulation of snow or ice on the vent which could clog it and prevent its proper functioning.

In a preferred embodiment of the vent and overflow means of the invention, the aforementioned conduit is preferably formed with a breather opening therein positioned to be disposed within the vessel and above the predetermined high fluid level in the vessel. The breather opening is small enough to prevent objectionable quanities of steam to escape from the vessel, but should be large enough to prevent it from being easily plugged. However, should such breather opening become plugged, the vent will function as aforedescribed upon the occurrence of any malfunction and prevent the development of explosive conditions.

A further important feature of the invention has to do with the incorporation of vent cap means at the outer end of the conduit defined by a collar portion having an inverted cup-shaped portion at its outer end. The collar portion may be provided with a lateral discharge opening through which fluid from the vessel may escape to drain, and in which the inverted cap functions to deflect any excess fluid escaping from the vessel beyond the capacity of the lateral discharge of the collar portion fluid radially outwardly and downwardly toward the outer upper end of the vessel.

A further feature of the invention is the incorporation of opening means in the inverted cup-shaped member for connecting a source of supply fluid for passing through the conduit and into the vessel for replenishing the fluid in the vessel.

Accordingly, it is an object of the present invention to provide a combined vent and overflow means of the character above described embodying open ended conduit means with a fluid containing vessel with the outer open end of the conduit opening externally of the vessel, and with the lower open end lying below the surface of a predetermined low level of the fluid in the vessel.

A further object is to provide a combined vent and overflow means as last noted in which the conduit embodies a breather opening lying inwardly of the vessel and above the surface of the normal high level of fluid in the vessel.

A further object is to provide a combined vent and overflow in accordance with the above first stated object embodying vent cap means at the outer open end of the conduit having collar means provided with the lateral opening for discharge of fluid flowing through such conduit from said vessel.

A further object is to provide a combined vent and overflow as last noted in which the vent cap means is formed with an inverted cup-shaped portion at its outer end for deflecting fluid escaping form the vessel through the conduit radially outwardly and downwardly toward the outer upper end of the vessel.

A still further object is to provide a combined vent and overflow means as last noted in which the inverted cup-shaped portion is provided with an opening through which fluid may be supplied from an outside supply source through the conduit and into the vessel.

A preferred embodiment of the invention will now be described in connection with the accompanying drawing in which the single figure illustrates the incorporation of the vent and overflow means of the present invention with an enclosed fluid containing vessel.

Referring now to the drawing, the improved vent and overflow means of the present invention is indicated generally at 6 incorporated with an enclosed fluid containing vessel, as at 7, which may, by way of example, be a boiler or a receiving tank for use in heating or in carrying out processes utilizing a heated fluid such as water.

Float valve means 8 is illustrated diagrammatically in the drawing and it may be of any of a wide variety of known constructions which embody a float, such as indicated at 9, lying inwardly of the vessel 7 and movable in response to change of level of the liquid within the vessel 7. In the position of the float 9, indicated at A, the water level is at a predetermined desired low level and in which the float valve means 8 provides the admission of fluid in a conventional manner from a supply source (not shown) into the vessel 7. In the intermediate position B of the float the fluid level is at a normal operating level and provides for continued admission of fluid into the vessel 7 at a desired rate. In position C of the float 9 the fluid level is at a predetermined normal high level and the float valve means 8 is effective to shut off or prevent admission of fluid from the supply into the vessel 7. Float valve means 8 functioning in the manner above described for admitting fluid, such as water, from a supply source are well known in the art, and it is believed that further detailed description is not necessary for an understanding of the present invention.

In the apparatus shown in the drawing, heating means, generally indicated at 10, is disposed adjacent the base of the vessel 7 to provide for heating of the fluid in the vessel. Again, a wide variety of known heating arrangements may be employed and in the particular embodiment illustrated in the drawing the heating means comprises a perforated heater tube 11 through which steam may be admitted into the vessel for heating the fluid therein. The perforated tube 11 is supported in a fitting 14 mounted in a side wall 12 of the vessel 7. A steam inlet pipe 15 has threaded connection with the fitting 14 and flow of steam from a steam supply pipe 16, is under the control of a known type of steam control valve means 17 which controls the flow of steam from supply pipe 16 into the vessel in response to heat sensitive control means such as thermostatic control means of known construction responsive to the temperature of the fluid in the vessel 7. The aforedescribed components of the heating means 10 are all well known, and hence have only been diagrammatically shown in the drawing. It will be understood that a wide variety of other heating means may be employed as, for example, electrical heaters or other known heating components for the purpose of controlling the temperature of the fluid within the vessel 7 for the desired purpose. Also, heated fluid within the vessel 7 may be withdrawn from the vessel in any suitable known manner.

Turning now to the vent and overflow means of the present invention, such means is defined by a pipe or conduit 20 extending vertically through the upper end 22 of the vessel. The conduit 20 may be defined by a simple straight section of pipe open at its upper end, as at 23, and open at its lower end as at 24. The conduit 20 extends vertically into the vessel 7 with the upper open end 23 thereof opening externally of the upper end of the vessel 7, and with the lower upper end 24 of the conduit being disposed below the surface of the predetermined low fluid level in the vessel 7. The conduit 20 is formed with a breather opening 26 to lie within the vessel 7 and above the predetermined normal high fluid level of the fluid in the vessel.

In the arrangement of parts thus far described the fluid level will effect corresponding movement of the float 9 of valve float means 8. The breather opening 26 serves to allow the vessel 7 to breath and to maintain atmospheric pressure within the vessel 7. The hole breather 26 is small and prevents objectionable quantities of steam from escaping in the room, and preferably should be sufficiently large to prevent it from being easily clogged. Since the conduit 20 extends below the surface of the predetermined low fluid level of the fluid in the vessel, it prevents escape of excessive amounts of steam through the conduit 20, since the area of the conduit at its open end 24 is small compared to the total surface area of the liquid within the vessel 7. Also, if the fluid level in the tank becomes abnormally high, the water will rise in the conduit 20 outwardly of the upper closed end 22 of the vessel 7. This could occur, for example, if the water feed under the control of the control valve means 8 should fail or in the event a large amount of condensate is returned to the tank. Also, should the steam control valve means 17 fail, allowing steam near or at boiler pressure to enter into the vessel, the fluid in the vessel 7 will discharge out the conduit 20 through the outer open end thereof.

The combined overflow and vent means 6 further comprises vent cap means, indicated generally at 30, defined by a collar portion 32 suitably secured to and connected to the outer projecting end of the conduit 20, and an inverted cup-shaped portion 33 having discharge openings 34 at the lower portion thereof and around the periphery of the outer end of the collar portion 32. The collar portion 32 is provided with a tapped lateral outlet 35 into which a drain pipe 36 may have threaded connection, and which pipe 36 through an elbow 37 has connection with a pipe 38 extending to a floor drain as shown at 39. Thus fluid passing from the vessel through the conduit 20 may be discharged laterally from the collar portion 32 to the drain 39.

The inverted cup-shaped portion 33, in the event of flow of fluid from the vessel 7 through the conduit 20 in excess of that of the capacity of the aforedescribed drain arrangement, is discharged radially outwardly and downwardly at the upper closed end of the vessel 7.

The inverted cup-shaped portion 33 may be provided at the upper dome portion thereof with a tapped opening 40 for threaded engagement with one end of an elbow 42. A fluid supply pipe 43 connects the other end of the elbow with a solenoid valve 44 of known construction from which a pipe 45 extends to a source of fluid supply, such as city water supply source. The solenoid 44 may be energized in conventional manner upon demand of water for vessel 7 to admit water from the supply pipe 45 into the vent cap means for passage through the conduit 20 into the vessel 7 to thus provide an alternate or supplemental source of fluid supply for the vessel 7. The construction of the vent cap means above described thus provides a sanitary break between water from a city water supply and pipe 45 so as to prevent drawing water from the vessel back into the supply pipe 45 in the event a vacuum occurs on the supply pipe 45.

The invention claimed is:

1. A combined vent and overflow means for an enclosed fluid containing vessel having associated therewith float control means and fluid heating means for maintaining fluid in the vessel at predetermined high and low levels, and for heating the fluid in the vessel, respectively, comprising a hollow conduit extending vertically through the upper end of the vessel, said conduit having an upper open end and a lower open end, said upper open end of said conduit opening externally of said upper end of the vessel, and said lower open end of said conduit lying below the surface of the predetermined low level of the fluid in the vessel, and a vent cap means mounted at the upper end of said conduit for discharging fluid escaping from the vessel through said conduit.

2. The combined vent and overflow means of claim 1 characterized by the provision of a breather opening in said conduit inwardly of the vessel and above the surface of the predetermined high level of the fluid in the vessel.

3. The combined vent and overflow means of claim 1 characterized by the provision that said vent cap means includes an inverted cup-shaped portion for deflecting fluid escaping from the vessel through said conduit radially outwardly and downwardly toward the outer upper end of the vessel.

4. The combined vent and overflow means of claim 3 characterized by said inverted cup shaped portion of said vent cap means having an opening therein for supplying fluid from an outside source through said conduit and into said vessel.

5. The combined vent and overflow means of claim 1 characterized by the provision that said vent cap means includes a collar portion connected to said conduit at the outer end thereof having a lateral outlet for discharging fluid escaping from the vessel through said conduit.

6. The vent and overflow means of claim 1 characterized by the provision that said vent cap means comprises a collar portion connected to said conduit at the outer end thereof, and an inverted cup-shaped portion at the outer end of said collar portion, with an opening formed between the outer edge of said cup-shaped portion and said outer end of said collar portion, said collar portion having a lateral opening therein for discharging fluid passing from the vessel through said conduit, and said inverted cup-shaped portion deflecting the fluid escaping from said vessel and passing through said collar portion radially outwardly and downwardly toward the upper end of the vessel.

7. The vent and overflow means of claim 6 characterized by the provision of an opening in said inverted cup-shaped portion for supplying fluid from an outside source through said conduit and into the vessel.

References Cited

UNITED STATES PATENTS

| | | | |
|---|---|---|---|
| 995,930 | 6/1911 | Walker | 137—216 |
| 1,324,597 | 12/1919 | Jansen | 137—588 |
| 2,056,357 | 10/1936 | Luff | 137—216 |
| 2,786,126 | 3/1957 | Kendon | 137—589 XR |
| 3,158,169 | 11/1964 | Smith | 137—216 |

HENRY T. KLINKSIEK, Primary Examiner

U.S. Cl. X.R.

137—216